United States Patent
D'Evelyn et al.

(10) Patent No.: US 7,251,312 B2
(45) Date of Patent: Jul. 31, 2007

(54) METHOD AND SYSTEM FOR AVAILING PARTICIPANTS IN A SPECIAL NUMBER CALL EVENT AND OTHERS OF INFORMATION CONTAINED IN A PLURALITY OF DATA STORES

(75) Inventors: Linda Kaye D'Evelyn, Lafayette, CO (US); Michael Jay Nelson, Louisville, CO (US); Peter Roy Schmidt, Westminster, CO (US); Gregory Wilfred Bruening, Boulder, CO (US); Alev G. Viggio, Boulder, CO (US); David Clark Oberto, Broomfield, CO (US); Charles Stuart Miller, Centennial, CO (US)

(73) Assignee: Intrado Inc., Longmont, CO (US)

( * ) Notice: Subject to any disclaimer, the term of this patent is extended or adjusted under 35 U.S.C. 154(b) by 542 days.

(21) Appl. No.: 10/655,971

(22) Filed: Sep. 6, 2003

(65) Prior Publication Data

US 2005/0053209 A1   Mar. 10, 2005

(51) Int. Cl.
*H04M 11/04* (2006.01)
(52) U.S. Cl. .............................. 379/45; 379/42; 379/37
(58) Field of Classification Search ................. 379/45, 379/37–44, 216.01; 455/556.1, 404.1, 404.2; 370/352
See application file for complete search history.

(56) References Cited

U.S. PATENT DOCUMENTS

| | | | |
|---|---|---|---|
| 5,195,126 A | 3/1993 | Carrier et al. | |
| 5,805,670 A | 9/1998 | Pons et al. | |
| 6,151,385 A | 11/2000 | Reich et al. | |
| 6,415,018 B1 | 7/2002 | Antonucci et al. | |
| 6,778,818 B1 * | 8/2004 | O'Neil | 455/404.1 |
| 2003/0086539 A1 * | 5/2003 | McCalmont et al. | 379/45 |
| 2004/0190497 A1 * | 9/2004 | Knox | 370/352 |

* cited by examiner

*Primary Examiner*—Melur Ramakrishnaiah

(57) ABSTRACT

A method for availing participants and others in a special number call event of information contained in a plurality of data stores includes the steps of: (a) in no particular order: (1) providing the plurality of data stores; (2) providing at least one respective data key for accessing the information contained in each respective data store of the plurality of data stores; and (3) providing communications among the participants and the plurality of data stores; (b) identifying a respective call as initiating a special number call event; (c) generating an identifier code for uniquely identifying the special number call event; the identifier code including relational data; the relational data being mappable on the at least one the respective data key to effect accessing the information; and (d) employing the communications to effect cooperation by the identifier code with each respective data store for providing the information to the participants.

27 Claims, 5 Drawing Sheets

METHOD AND SYSTEM FOR AVAILING PARTICIPANTS IN A SPECIAL NUMBER CALL EVENT AND OTHERS OF INFORMATION CONTAINED IN A PLURALITY OF DATA STORES

BACKGROUND OF THE INVENTION

The present invention is directed to special call handling methods and systems, and especially to special call handling systems and methods embodied in emergency service call handling methods and systems. The present invention is particularly useful for participants in a special number call, such as an emergency service call, as well as for users accessing special number call-related data.

In today's special number call systems, such as emergency service call systems, a caller's telephone number may relate the call event with both ALI (Automatic Location Information) and Supplemental ALI information contained in database systems located at a respective PSAP (Public Service Answering Point or Public Service Answering Position) or elsewhere. The telephone number used in such situations is not always unique to a specific call event. For example, the same telephone number may be used to place a plurality of service request calls. Such a lack of uniqueness is particularly the case when the service request call involves a mobile phone, Voice over Internet Protocol (VoIP), or an Automatic Crash Notification (ACN) call where pseudo or temporary telephone numbers are assigned to facilitate routing of the call to a geographically appropriate PSAP. The temporary or pseudo telephone numbers may also be used for call-back to a calling party by a PSAP or other call participant, such as a first responder (e.g., police, fire or medical service personnel). Such temporary telephone numbers are typically embodied in a pool of numbers assigned by each service provider to a given PSAP or other call handling entity and are reused after a particular call event ends. As a result in such situations no unique identifier is available to tie 9-1-1 call events (i.e., emergency service call events) directly with diverse databases that can provide valuable information to emergency service call participants during the pendency of the call event, or to regulatory agencies studying historical or statistical information regarding such calls after the conclusion of the event. Similar limitations apply equally regarding other special number call participants. By way of example and not by way of limitation, special number call participants in the context of an emergency service call may include PSAPs, first responders, hospital personnel or subscribers to commercial 9-1-1 Personal Safety Services, such as Emergency Notification Services (a service for calling designated parties whenever a 9-1-1 call is placed from a phone designated by the subscriber) or a 9-1-1 Personal Information Services (where subscribers can pre-notify Public Safety personnel of important medical conditions or other household). When there is no common tie available to the various participants in an emergency service call, each user of the 9-1-1 call data must individually query databases and verbally pass call-event related information verbally along to each subsequently contacted party. For example, the PSAP may need to communicate caller-related medical conditions to a first responder; the first responder must pass on caller-related medical conditions to a hospital, and the hospital must pass on caller-related medical conditions to an insurance company. Other authorized users accessing data specific to special call event data have similar information needs and encounter similar information passing inefficiencies.

No identifier exists with prior art special number service call systems, such as emergency service call systems, that can relate information and facilitate information transfer among participants, external databases, data stores and/or applications (e.g., state, federal, local agency or homeland security) during or following individual service call events.

The phrase "and/or" is employed throughout this description to indicate that both a conjunctive relation and an alternative relation apply among terms. For example, the expression "A and/or B" intends to describe both relationships (1) A and B, and (2) A or B.

Prior art emergency service call systems use a caller's TN (telephone number) to query both an ESME (Emergency Services Messaging Entity that includes an ALI system and associated network elements) and Supplemental ALI information contained in PSAP-located database systems. No unique identifier is available to directly tie 9-1-1 call events with information contained in diverse databases, data stores and applications that can be of value to call participants such as, but not limited to, PSAPs, first responders, hospital personnel or subscribers to commercial services such as 9-1-1 Personal Information Services or Emergency Notification Services during pendency of the call event or after the event is concluded. Any of various agencies may find it valuable to study historical or statistical information relating to a call event after the event is concluded, or to access data during pendency of the call event for real-time predictive algorithms. Such agencies may include, by way of example and not by way of limitation, government agencies such as the Department of Homeland Security, the Centers for Disease Control (CDC) or the Federal Emergency Management Agency (FEMA). First responders do not have information available to them that may prepare them or alert them to properly equip to deal with a 9-1-1 call.

Subscribers to commercial 9-1-1 Personal Safety Services do not presently have a method by which they can pre-notify first responders regarding vital data that could save lives and reduce medical costs, such as key medical conditions, number of children, disabled persons or pets in a household (for rescue and fire response) or the nearest hospital covered by the subscriber's insurance. Some PSAPs have auxiliary on-site ALI (Automatic Location Information) databases with supplemental information relating to telephone numbers. However, these auxiliary ALI databases frequently contain outdated or inaccurate information. This occurs primarily for two reasons. First, PSAPs are not automatically notified when a TN is moved, deleted or reassigned through Telco (telephone company) ALI database processing. Consequently, supplemental data for the past owner of TN might erroneously be provided to the PSAP or first responder during a 9-1-1 call event. Second, PSAP personnel must update and maintain the databases. Updates are typically received annually via responses to mail questionnaires returned by the public. The receipt of updated information is often spotty at best, and PSAP personnel often haven't enough time to effect the required data entries to update the database.

A dissimilar situation exists with systems commonly referred to as Personal Emergency Response Services (PERS). In a PERS system a commercial subscriber's medical information is housed in a proprietary database and the subscriber wears a pendant with an attendant call button. In the event the subscriber needs to call 9-1-1 but cannot reach a phone, for example an elderly person that has fallen, then the subscriber may access the commercial PERS system by activating the pendant button to reach a PERS call center. The PERS call center accesses the subscriber's medical history via the proprietary database. In this case, the subscriber's medical history may be assumed to be accurate. However, the PERS proprietary database is not automatically tied to changes in the TN submitted by the phone service provider, nor is the PERS proprietary database tied to PSAP specific information such as call history databases or supplemental ALI databases that the PSAP may maintain.

First responders may not be able to deal with 9-1-1 calls without the event-related data as well as they could if that information were automatically provided to them. As prior art emergency service communications systems are configured, each participant in an emergency service call must have individual access to each database system from which information is desired. Additionally, subscribers to commercial 9-1-1 Personal Safety Services cannot presently pre-notify first responders regarding vital data that could save lives and reduce medical costs. Moreover, no identifier presently exists to tie information in external databases, such as state, federal and local agencies with 9-1-1 call events. Such a link or tie would be valuable in reconstructing events or in gathering statistical information.

There have been attempts at solving this need for information sharing relating to 9-1-1 call events, especially as it applies to notification services. U.S. Pat. No. 5,195,126 to Carrier et al. for "Emergency Alert and Security Apparatus and Method", issued Mar. 16, 1993, discloses a monitor/router device connected to a 9-1-1 selective router tandem switch or to a caller's phone instrument to detect a TN (telephone number) called and initiate a notification service. Carrier et al. do not disclose a system or method for uniquely identifying a call event or for availing participants and others in a special number call of information contained in a plurality of data stores.

U.S. Pat. No. 5,805,670 to Pons et al. for "Private Notification System for Communicating 9-1-1 Information", issued Sep. 8, 1998, discloses a private 911 information database and notification service that is triggered through equipment installed directly in a 9-1-1 call center (PSAP). Pons et al. do not disclose a system or method for uniquely identifying a call event or for availing participants and others in a special number call of information contained in a plurality of data stores.

U.S. Pat. No. 6,151,385 to Reich et al. for "System for the Automatic Notification That a 9-1-1 Call Has Occurred", issued Nov. 21, 2000, discloses a system in which the TN (telephone number) for every ESME (Emergency Services Messaging Entity) query is output to a separate notification system. The notification system then identifies which TNs (telephone numbers) correspond to subscribers' TNs and pulls the pre-selected notification list associated with an appropriate subscriber. An automatic call is placed to each party designated for notification to announce that a 9-1-1 call has been made from the subscriber's TN. Reich et al. do not disclose a system or method for uniquely identifying a call event or for availing participants and others in a special number call of information contained in a plurality of data stores.

U.S. Pat. No. 6,415,018 to Antonucci et al. for "Telecommunication System and Method for Handling Special Number Calls Having Geographic Sensitivity", issued Jul. 2, 2002, discloses a notification bridge located at a telecommunication service provider's ALI (Automatic Location Information) system that operates as a gateway between a PSAP and a notification database and a supplemental information database (the additional databases). The notification bridge permits exchange of data between the PSAP and one or both of the additional databases. Antonucci does not disclose a system or method for uniquely identifying a call event or for availing participants and others in a special number call of information contained in a plurality of data stores.

There is a need for a method and system for availing participants and non-participants in a special number call, such as an emergency services call, of information related to the call contained in a plurality of data stores.

There is a need for a method and system for availing participants and non-participants in a special number call, such as an emergency services notification request from a non-voice device, by way of example and not by way of limitation, a 2-way pager, a PDA (personal digital assistant), any wireless-connected device (using any communication frequency including RF and light signals), any internet-connected device, a Personal Emergency Response system, of information related to the call contained in a plurality of data stores.

There is a need for a method and system that enables automatic provision of event related data without requiring individual access to each database, data store or application.

There is a need for a method and system that enables post-event evaluation and study of information contained in a plurality of data stores that are related to a special number call.

The present invention is applicable generally to special number call systems. Descriptions and illustrations regarding the invention disclosure will hereinafter be presented in the context of an exemplary 9-1-1 emergency service call system.

The present invention satisfies the needs mentioned above by providing PSAPs (and other special number call handlers) and first responders with a capability for real-time access to information of diverse data providers, such as emergency call information. The access is automatically tied to a special number call event such as a 9-1-1 call event.

Additionally, subscribers to commercial 9-1-1 Personal Safety Services can pre-notify emergency responders, hospitals and others of critical household conditions and identify insurance providers with appropriate information about subscribers to such commercial 9-1-1 Personal Safety Services. The unique IID (incident identification) employed by the present invention provides a mechanism to facilitate information transfer among and association of 9-1-1 call events with multiple databases and applications containing related information. The IID provides a simplified tie or relation between a respective special number call event (e.g., a 9-1-1 call event) and all related information and databases queried regarding the respective call event. The tie provided by the IID persists both during and after the call event.

SUMMARY OF THE INVENTION

A method for availing participants and others in a special number call of information contained in a plurality of data stores includes the steps of: (a) in no particular order: (1) providing the plurality of data stores; (2) providing at least one respective data key for accessing the information contained in each respective data store of the plurality of data stores; and (3) establishing communications among the participants and the plurality of data stores; (b) identifying a respective call as initiating a special number call event; (c) generating an identifier code for uniquely identifying the special number call event; the identifier code including relational data; the relational data being configured for mapping on the at least one the respective data key to effect accessing the information; and (d) employing the communications to effect cooperation by the identifier code with each the respective data store for providing the information to the participants.

Because the identifier code persists after the conclusion of the call event, this method also avails non-participants of information related to a call event that is contained in a plurality of data stores. Although the description hereinafter set forth is stated in terms of participants in a special number call, it is to be understood that the invention works equally well for non-participants, such as government agencies, who might need to study information related to call events that is contained in a plurality of data stores.

A system for availing participants and others in a special number call of information contained in a plurality of data stores, each respective data store of the plurality of data stores having a respective data key for accessing the information contained in the respective data store, includes: (a) a special number call handling facility; (b) at least one communication network communicatingly coupling the participants, the plurality of data stores and the special number call handling facility; and (c) an identifying unit coupled with at least one of the special number call handling facility and the at least one communication network. The identifying unit identifies a respective call as initiating a special number call event and generates an identifier code for uniquely identifying the special number call event. The identifier code includes relational data that is configured for mapping on at least one respective data key to effect accessing the information. The special number call handling facility employs at least one communication network for providing the information to the participants.

It is, therefore, an object of the present invention to provide a method and system for availing participants and non-participants in a special number call, such as an emergency services call or emergency services notification request from a non-data device, of information related to the call contained in a plurality of data stores.

It is a further object of the present invention to provide a method and system that enables automatic provision for event related data without requiring individual access to each database, data store or application.

It is a still further object of the present invention to provide a method and system that enables post-event evaluation and study of information contained in a plurality of data stores that are related to a special number call.

Further objects and features of the present invention will be apparent from the following specification and claims when considered in connection with the accompanying drawings, in which like elements are labeled using like reference numerals in the various figures, illustrating the preferred embodiments of the invention.

DETAILED DESCRIPTION OF THE PREFERRED EMBODIMENT

Figure 1:
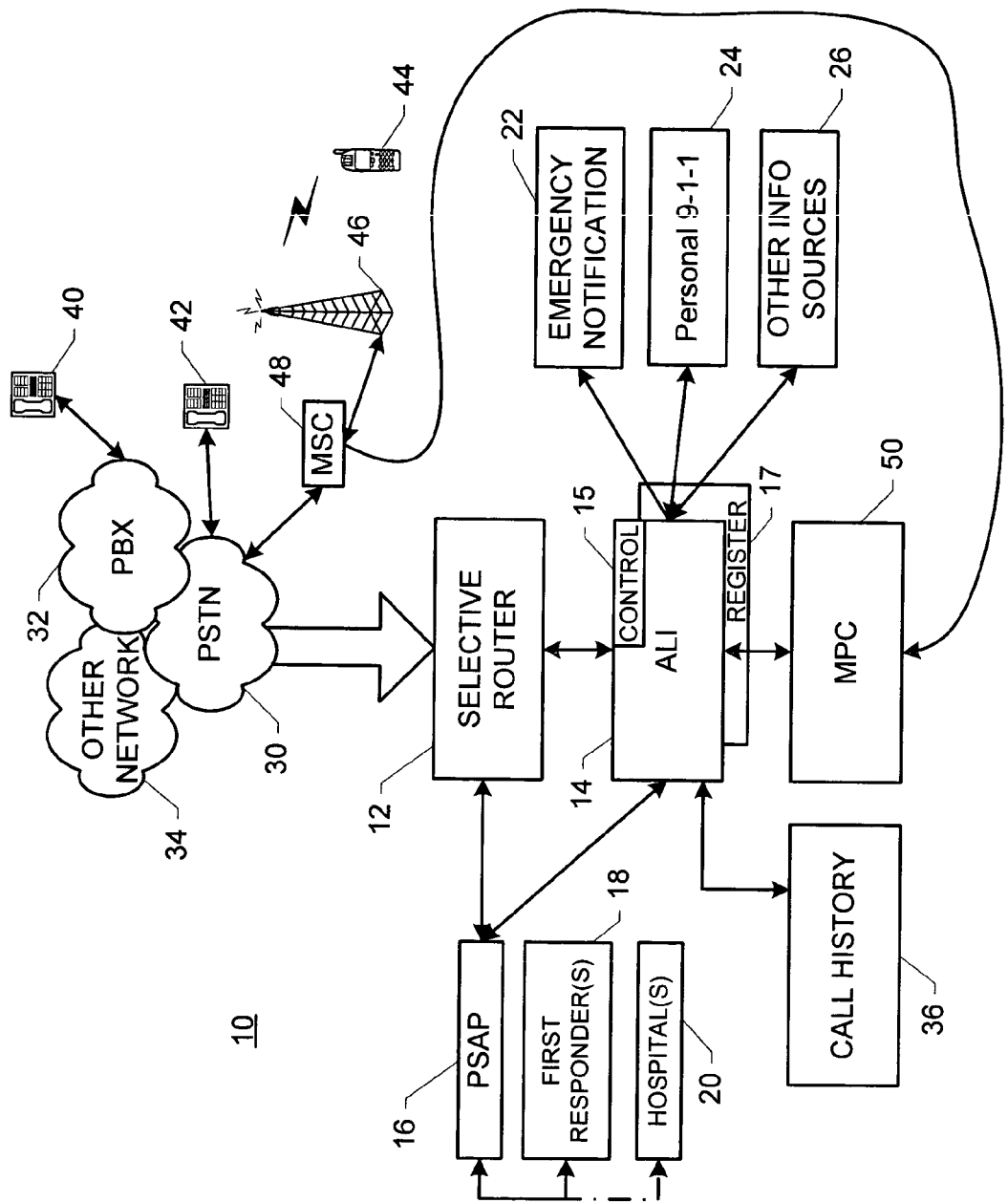
FIG. 1 is a simplified schematic diagram of a first representative emergency services call system suitable for employing the method and system of the present invention.

The present invention may be employed with special number telecommunication systems, such as abbreviated number emergency services notification and dispatch systems. Such emergency services notification and dispatch systems are commonly known as 9-1-1 systems in the United States.

The present invention applies generally to special number calls. The preferred embodiment of the present invention provides for assigning a unique incident identification (IID) to each special number call. In the exemplary system and method disclosed herein, the special number call is embodied in an emergency services call system (i.e., a 9-1-1 system). Preferably the IID is communicated to a Public Safety Answering Point (PSAP) along with related 9-1-1 ALI (Automatic Location Information or Automatic Location Identification) data. The IID serves to associate information from diverse databases or applications to the specific 9-1-1 call event and facilitates transfer of information among databases, data stores, applications and participants in the 9-1-1 call event.

The present invention is also advantageous for authorized agencies interested in accessing or analyzing special number event call-related data such as agencies performing criminal investigations, homeland security applications, Centers for Disease Control (CDC) and other agencies.

The present invention includes a method and system applicable to hybrid private/public telecommunication networks such as are found in today's market. Thus, the present invention is advantageous for use by a public telephone service provider (such as an incumbent local exchange company—ILEC), a competitive local exchange carrier (CLEC), an Internet service provider (ISP), a wireless service provider (WSP), a large enterprise customer using a private exchange such as a private branch exchange (PBX), a wireless traffic aggregator/reseller switching between various backbone providers, a satellite telephone service provider or any other telephone service provider that may have users, or customers, employing their service to access a special number service seeking assistance, such as a caller seeking emergency service using a 9-1-1 system.

The present invention will be further disclosed and explained hereinafter using an exemplary emergency services call system, such as a 9-1-1 system.

During a 9-1-1 call event, an IID (incident identification) is preferably assigned by either an ESME (Emergency Services Messaging Entity) that includes an ALI (Automatic Location information) system and associated network elements, is assigned dynamically by a selective router tandem or switch used for emergency call routing, or can be passed through a selective router tandem from another telecommunications system element that has identified the 9-1-1 call at an earlier (upstream) recognition point along a network path. By way of example and not by way of limitation, such earlier upstream recognition points include a Mobile Positioning Center (MPC) for a wireless call, ELIN or NLIS for a VoIP (Voice over Internet Protocol) call, or a Call Center or automated system for an Automatic Crash Notification (ACN) call. All communication system participants or elements that generate IIDs preferably use a common algorithm or scheme for generating the incident identification number (IID) to ensure a globally unique IID. Any communication system element may perform as an ID-generating element so long as that element can identify that a particular call is a 9-1-1 call. The selective router tandem that completes routing of the 9-1-1 call to a PSAP is a preferred communication system element at which a call may be unequivocally identified as a 9-1-1 call without having to provide additional equipment to make such a determination. An ESME is another communication system element at which a call may be unequivocally identified as a 9-1-1 call without having to provide additional equipment. For purposes of further description herein, it will be presumed that an ESME effects assignment of the IID to 9-1-1 calls upon the occasion of an inquiry to the ESME for ALI information.

Thus, by way of example and not by way of limitation, an ESME may employ a unique ID-generating scheme such as:
1. 2 alphanumeric digits designating a respective IID-generating element (e.g., an ESME);
2. 8 digits designating the date of the call (e.g., a MMD-DYYYY format);
3. 2 digits designating the hour of the day (e.g., a 24-hour clock);
4. 5 digits designating a sequential event count; and
5. 1 digit indicating a PSAP query to the ALI.

Using such an IID-generating scheme, an IID "A2-12312003-1100914-1" would indicate: ESME 'A2' generated the IID. The date was Dec. 31, 2003. The time was between 11 AM and noon. This call was the $914^{th}$ 9-1-1 call received by the ESME during this hour. This was the first ALI response to the PSAP. When external systems dynamically provide the IID through the selective router tandem (i.e., when the IID-generating communication system element is "upstream" of the selective router tandem), only the first two digits identifying the IID-generating communication system element may be required from the IID-generating element; other portions of the IID necessary to render the IID unique for the extant 9-1-1 call may be added by other communication system elements as the call is passed from element to element as it traverses the communication system to the PSAP and a query of the ALI is carried out. In such a situation, the system must operate so that the finally constructed IID is unique to the extant 9-1-1 call event.

The preferred embodiment of the present invention will be effected using a registration or subscription arrangement for authorizing participation by a respective database, data store or application in the system. Preferably each database, data store or application seeking to participate in information sharing using the present invention will register with an ESME (Emergency Services Messaging Entity) to identify origin-indicators, such as telephone numbers (TNs), street addresses, IP (Internet protocol) addresses, e-mail addresses, regional locations, individuals or other data for which additional information is stored. Telephone number (TN) may refer either to an actual call-back number of a wireline or wireless caller or may refer to a temporary TN-like identifier or pseudo-ANI (Automatic Number Identification) such as ESRK/ESRD (Emergency Service Routing Key/Emergency Service Routing Digits; for wireless 9-1-1 call processing), ESQK (Emergency Service Query Key) for automatic crash notification (ACN), ELIN (Emergency Location Identification Number) or ESQK for VoIP (Voice over Internet protocol) call processing or other TN-like numbers in compliance with the E.164 CCITT/ITU-T Recommended Standard, commonly known as "The international public telecommunication numbering plan". CCITT/ITU-T refers to international standards setting bodies—Consultative Committee on International Telegraphy and Telephony (CCITT) and International Telecommunication Union-Telecommunication sector (ITU-T).

Databases, data stores or applications eligible for registration may, by way of example and not by way of limitation, include (1) a personal 9-1-1 information database that includes subscriber-provided data related to a household or business, such as key medical conditions (e.g., hearing impaired, diabetic, allergies, illnesses, wheel-chair bound), special site conditions or hazards (e.g., dangerous dog, barred windows), number of small children or presence of a disabled person in a home; (2) emergency notification service (i.e., notifying a pre-selected list of callees that a 9-1-1 call has occurred from a phone specified by the subscriber); (3) medical, auto or homeowners insurance company; (4) HAZMAT (hazardous materials) information for a residential or business location; (5) building or site layouts; (6) homeland security application; (7) call event history regarding previous 9-1-1 calls from the same caller or from the same location; (8) automatic crash notification (ACN) systems (including injury prediction information, driver or rider medical information or special conditions); (9) criminal history information; and (10) federal or state databases (e.g., motor vehicle records, FBI records).

If the database, data store or application uses a data key other than TN (telephone number) to identify, sort and retrieve records, then registration of the database must provide the different data key along with a the relationship of the data key with associated TNs. For example, an insurance company database might use Social Security Number (SSN) of policy holders as a data key. During the registration process, the insurance company must provide the SSN/TN relationship for both wireline and wireless TNs of policy holders listed on a policy.

Preferably the ESME (Emergency Services Messaging Entity) includes or has access to a data key register in which databases have registered data keys associated with respective origin-indicators for facilitating access to information. Origin-indicators include, by way of example and not by way of limitation, telephone numbers, a pseudo-ANI such as ESRK, call back number, IP address, email address or another indication of origin of a call. Some origin-indicators indicate origin only in a gross sense. For example, ESRKs, indicate origin only to a particular telecommunication carrier at a particular PSAP. In contrast, telephone numbers (TNs) indicate origin to a particular phone instrument. The data key register is populated with data by a registration process carried out by external databases.

It is preferred that during the registration process an identifier be provided to selected, individual ALI records within the ESME to indicate particular origin-indicators such as TNs for which additional databases or applications have registered. This individual TN identifier can be configured to be resident on any of several databases. By way of example and not by way of limitation, the identifier may be resident on one of the following: (1) an Automatic Location Information (ALI) database; (2) an adjunct database directly connected to ESME; or (3) an ESME controller system. It is preferred that the identifier be resident on only one database. Alternatively if no such TN identifier is provided, the data register can be referenced as a matter of routine processing within the ESME.

If a wireline or wireless dial-tone provider submits a delete or change notification to an ESME for a provisioned ALI record, it is preferred that each registered database be notified and the identifier for the affected ALI record may be reset. Each database, data store or application would there-after need to re-register to receive an IID push (i.e., to participate in queries based upon an IID) for the affected TN or subscriber.

During a 9-1-1 call event, the ESME will preferably check the configuration of the database identifier. When it is determined that a database, data store or application is registered for selected origin-indicators (e.g., TNs), the ESME will access the data key register to fetch the data key for the registered database, data store or application. The ESME will then "push" the data key (and preferably also "push" the associated IID) to the registered database, data store or application. Preferably the TN identifier is employed by the ESME to ascertain whether there has been registration by auxiliary databases with additional ALI information. If the identifier indicates such registration has occurred, a query will be made of the registered auxiliary databases using the IID and appropriate data key for each respective registered auxiliary database. Thus, the IID combined with an origin-indicator (e.g., a telephone number, a call back number, a geographic indicator such as an ESRK or another similar indicator) may be regarded as an identifier code that uniquely identifies a particular call event that includes information that is configured for mapping on the respective data keys contained in a data key register. The data keys provide access to respective databases, data stores and applications.

Each database, data store or application is registered to establish data keys for selected origin-indicators. Registration involves providing data keys for respective databases, data stores or applications relating to origin-indicators expected to be received so that a respective origin-indicator (e.g., a telephone number) may be mapped onto data keys to access data within a respective database, data store or application. The identifier code (i.e. the IID plus the origin-indicator) is "pushed" to the register to effect mapping onto appropriate data keys. The registration of a database, data store or application and the attendant provision of data keys assures that other data may be accessed later during the event or even after the event is ended. Preferably only selected registered databases or data stores are initially queried for additional information to be returned with E9-1-1 ALI data return to the PSAP. This is to avoid overly delaying initial information provision to the PSAP. Dynamic retrieval of all or part of an ALI record can add several seconds of delay before the complete ALI record can be returned to the PSAP. Because seconds count in 9-1-1 emergency situations, such a delay should only be added when the value of the dynamically retrieved additional information exceeds the extra risk added by delaying the ALI return. Preferably registration applies to databases, data stores and applications only. PSAPs preferably will preferably always receive the IID along with information from the E9-1-1 ALI database. If desired, other databases may also be configured for always providing information to the PSAP without requiring registration.

After the IID is communicated to the PSAP with the 9-1-1 ALI data, the PSAP, first responder (emergency medical service (EMS), police or fire unit dispatched for the 9-1-1 emergency), hospital (to which the 9-1-1 caller is transferred) or insurance company (e.g., medical or auto insurance company of the 9-1-1 caller) may use the IID to query each eligible database or application (i.e., either registered or designated as always responding and not requiring registration) to retrieve data related to the 9-1-1 call event.

Information retrieval and transfer assumes that appropriate data permissions are established and satisfied by each requesting or receiving agency. The methods for database query can include verbal or facsimile (FAX) queries to call centers; wireless communication to retrieve data to mobile phone, pager, PDA (personal digital assistant) or another wirelessly connected system (including sophisticated ambulance and police systems); website queries and dedicated system queries.

For databases, data stores or applications with the appropriate high-security permissions, a 'push' during a 9-1-1 call event (i.e., a query based upon the IID and respective data key) may trigger the transfer of information related to the 9-1-1 call event between applications. For example, personal 9-1-1 information for a TN could be transferred to a homeland security application using the IID as the transfer-enabling mechanism.

During a 9-1-1 call event, if a call taker at a PSAP or First Responder provides dispatch information for the TN or IID, the dispatch information may be made available to registered databases, data stores or applications with appropriate permissions. The dispatch information may be used in conjunction with the IID to enable database information transfer. For example, if the PSAP call taker indicates that a 9-1-1 caller with a specific IID number will be transferred to a particular hospital, then personal 9-1-1 information (which may include insurance information) can be transferred to the hospital using the IID as the transfer-enabling mechanism. Alternately, insurance information may be provided to the hospital directly by the insurance company. Additionally, emergency notification services can provide this information to each party designated to be notified.

A personal 9-1-1 information database may contain critical information about a subscriber's household or business, such key medical conditions (e.g., hearing impaired, diabetic, allergies, illnesses, wheel-chair bound), special site conditions or hazards (e.g., dangerous dog, barred windows), PS/ALI (Private Switch/ALI; ALI information for access lines located within a PBX environment) or number of small children or disabled persons in a home or business. With such data available, a PSAP (Public Safety Answering Point) can confirm applicability of the information to the 9-1-1 caller and provide the first responders (i.e., emergency medical service (EMS), police or fire units) with this information before they arrive at the scene of the emergency. Having such detailed information available allows the first responders and others responding to the emergency to be better prepared and appropriately equipped to safely handle the emergency situation.

A subscriber of personal 9-1-1 information services (or to emergency notification services) may use any one of several methods for submitting information for inclusion in a data store such as, by way of example and not by way of limitation: via the Internet; calling a human operator; calling an IVR (interactive voice response) system, mailing in a form via U.S. Postal Service; entering information to a web site provided for receiving updates to the respective information database; submitting information via facsimile; submitting information via a Voice Over IP (VoIP) connection or by another communication method.

For those submission methods not involving a human operator, a subscriber may submit personal information using a respective submission method and an application program receives the update, validates the sender and sends the update to a database server to apply the data to the database. The database server applies the update to the database and registers with the applicable ESME for the subscriber's TN(s). Methods that involve a human operator work similarly except that instead of the subscriber submitting information to a server, a human operator enters the information to a server on the subscriber's behalf.

Subscribers to emergency notification services may preselect a list of TNs (including wireline, wireless, pager numbers), PDA address or e-mail addresses to be notified in the event that someone from their household or business places a 9-1-1 call from a phone or other communication device specified by the subscriber. As part of the subscription process, the emergency notification service must register for the subscriber's TN(s) and data key (if different from TN) with the applicable ESME. Often the data key for an emergency notification service data store is the origin-indicator (e.g., telephone number) of registered subscribers for the emergency notification service. During a 9-1-1 call event, the IID (incident identification) and the data key are "pushed" to the emergency notification service application. The emergency notification service application uses its respective data key to match the emergency notification list pre-selected by the subscriber and notifies each listed contact of the occurrence of the 9-1-1 call event. The notification method for contact can include, by way of example and not by way of limitation, an automated outcall notification message to a wireline or wireless phone; a text message to a pager, cell phone, or PDA; an e-mail notification message; a live caller or another communication mode.

FIG. 1 is a simplified schematic diagram of a first representative emergency services call system suitable for employing the method and system of the present invention. In FIG. 1, a special number call system is represented by an emergency services call system 10. System 10 includes a selective router tandem switch 12 coupled with an Automatic Location Information (ALI) database 14. A Public Safety Answering Point (PSAP) 16 is communicatingly coupled with selective router 12. PSAP 16 is also coupled for communicating with ALI database 14. PSAP 16 also is coupled for communicating with first responders 18 (e.g., emergency medical, police and fire facilities; not shown in detail in FIG. 1). First responders 18 may be coupled for communication with at least one hospital 20, as indicated by a dotted line coupling first responders 18 and hospital(s) 20.

ALI database 14 is coupled for communication with an emergency notification facility 22. ALI database 14 is further coupled for querying a personal 9-1-1 database 24 and other databases, data stores and applications, represented by a block 26 ("Other Info Sources"). Personal 9-1-1 database 24 contains supplemental ALI information relating to the registered telephone numbers of callers. Personal 9-1-1 database 24 may contain critical information about subscribers' households or businesses, as described earlier hereinabove.

9-1-1 emergency calls are received by selective router 12 from any of a variety of networks including, by way of example and not by way of limitation, a public switched telephone network (PSTN) 30, a private branch exchange (PBX) network 32, other networks 34 (e.g., an Internet Protocol network), or a combination of networks 30, 32, 34. Thus, a caller from a phone 40 associated with private branch exchange 32 may place a 9-1-1 call that will be routed via PBX network 32 and PSTN 30 to selective router tandem 12. Similarly, a caller from a phone 42 may place a 9-1-1 call via PSTN 30 to selective router tandem 12. A mobile phone 44 may be used to place a 9-1-1 call via a mobile tower 46, a mobile switching center (MSC) 48 and PSTN 30 to selective router tandem 12. MSC 48 is coupled with a mobile positioning center (MPC) 50. MPC 50 and ALI 14 cooperate both to route the 9-1-1 call to PSAP 16 and to provide position information relating to mobile phone 44 for use by PSAP 16 in selecting which first responders 18 to dispatch to aid the caller using mobile phone 44.

An IID (incident identification) is assigned to a 9-1-1 call in system 10 at a juncture within system 10 at which a call may be recognized as a 9-1-1 call. Several loci within system 10 may suffice for effecting assignment of an IID. By way of example and not by way of limitation, an IID may be assigned by selective router 12, by PSTN 30 (using digit recognition in routing information associated with a call), by ALI database 14 when selective router tandem 12 queries ALI database 14 for information, or at other junctures in system 10. It is preferred that an IID be assigned when selective router 12 queries ALI database 14 for information; it is at that time that a call is unequivocally a bona fide 9-1-1 call for which responsive action is being taken and for which information is required. If the selective router 72 switch type does not query ALI database 74 for information, which may occur, for example where on-board selective routing database tables are uploaded from ALI on a daily basis, then it is preferred that an IID be assigned when PSAP 76 queries ALI database 74 for information.

ALI controller 15 controls operation of ALI database 14. Queries made by ALI controller 15 (perhaps at the behest or request of an operator at PSAP 16) will be made of registered databases (i.e., other info sources 26) using the assigned IID and an appropriate data key for each respective database. Registered databases are databases that have deposited data keys and associated origin-indicators (e.g., TNs) in a data key register 17.

If the caller is a subscriber for emergency notification services to alert designated recipients that a 9-1-1 call is placed from the phone associated with the TN, then the assigned IID and data key of the call event will be 'pushed' to emergency notification facility 22. Emergency notification facility 22 uses the data key(s) (which may be a TN or other key) to match with an emergency notification list pre-selected by the caller-subscriber and contacts each party designated for notification of the occurrence of the 9-1-1 call event.

Personal 9-1-1 database 24 may involve subscriptions so that information may only be obtained from personal 9-1-1 database 24 if the caller placing the extant 9-1-1 call is a subscriber. Another configuration of system 10 may provide that personal 9-1-1 database 24 is a non-subscription service and ALI database 14 may query personal 9-1-1 database 24 for any 9-1-1 call to receive information contained in personal 9-1-1 database 24 for the caller placing the extant 9-1-1 call. Any database query to any database 24, 26 is preferably accompanied by the ID assigned to the extant 9-1-1 call event and by an appropriate data key (or data keys) for fetching information. The appropriate data key is obtained by ALI controller 15 from data key register 17.

Information obtained from databases 24, 26 and other information associated with the IID-identified 9-1-1 call event is stored in a call history database 36 with the assigned IID for later statistical evaluation, reconstruction or other historical or survey uses. By way of example and not by way of limitation, some such later uses may include statistical evaluations by homeland security or similar agencies, evaluation of the number of 9-1-1 calls received from a particular TN (telephone number) or other origin-indicator in a certain time period, an evaluation by an authorized state or federal agency of all data associated with a particular IID, or other historical or survey studies or evaluations. Preferably each registered database, data store and application also maintains a call history (not shown in FIG. 1) to facilitate later surveys, evaluations and other information gathering or event reconstruction.

Figure 2:
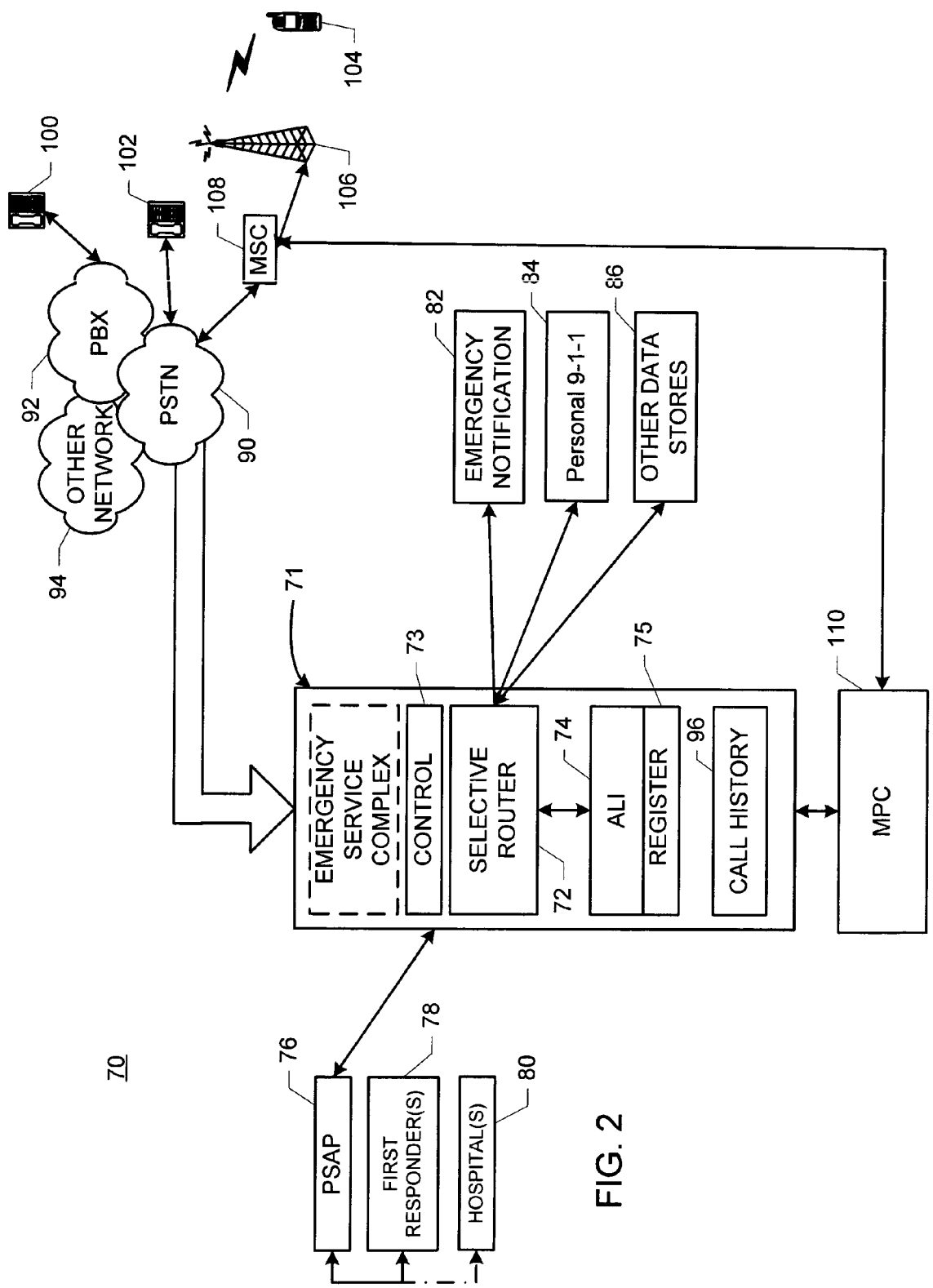
FIG. 2 is a simplified schematic diagram of a second representative emergency services call system suitable for employing the method and system of the present invention.

FIG. 2 is a simplified schematic diagram of a second representative emergency services call system suitable for employing the method and system of the present invention. In FIG. 2, a special number call system is represented by an emergency services call system 70. System 70 is configured substantially as described in U.S. Pat. No. 6,415,018 to Antonucci et al. for "Telecommunication System and Method for Handling Special Number Calls Having Geographic Sensitivity", issued Jul. 2, 2002. System 70 includes an emergency service complex 71 that includes a selective router tandem switch 72 coupled with an automatic location information (ALI) database 74. A Public Safety Answering Point (PSAP) 76 is communicatingly coupled with emergency service complex 71. Coupling PSAP 76 with emergency service complex 71 effects coupling among PSAP 76, selective router 72 and ALI database 74 (coupling details are not shown in detail in FIG. 2). PSAP 76 also is coupled for communicating with first responders 78 (e.g., emergency medical, police and fire facilities; not shown in detail in FIG. 2). First responders 78 may be coupled for communication with at least one hospital 80, as indicated by a dotted line coupling first responders 78 and hospital(s) 80.

ALI database 74 is coupled via selective router 72 in emergency service complex 71 for communication with an emergency notification facility 82. Alternatively, ALI database 74 may be coupled with emergency notification facility 82 without involving selective router 72 (not shown in FIG. 2). ALI database 74 is further coupled in a similar manner (that is, involving selective router 72 or not) for querying a personal 9-1-1 database 84 and other databases, data stores and applications, represented by a block 86 ("Other Info Sources"). Personal 9-1-1 database 84 contains supplemental ALI information relating to the telephone numbers of registered callers. Personal 9-1-1 database 84 may contain critical information about subscribers' households or businesses, as described earlier hereinabove.

9-1-1 emergency calls are received by emergency service complex 71 from any of a variety of networks including, by way of example and not by way of limitation, a public switched telephone network (PSTN) 90, a private branch exchange (PBX) network 92, other networks 94 (e.g., an Internet Protocol network), or a combination of networks 30, 32, 34. Thus, a caller from a phone 100 associated with private branch exchange 92 may place a 9-1-1 call that will be routed via PBX network 92 and PSTN 90 to emergency service complex 71. Similarly, a caller from a phone 102 may place a 9-1-1 call via PSTN 90 to emergency service complex 71. A mobile phone 104 may be used to place a 9-1-1 call via a mobile tower 106, a mobile switching center (MSC) 108 and PSTN 90 to emergency service complex 71. MSC 108 is coupled with a mobile positioning center (MPC) 110. MPC 110 is coupled with emergency service complex 71 and cooperates with ALI 74 both to route the call to PSAP 76 and to provide position information relating to mobile phone 104 for use by PSAP 76 in selecting which first responders 78 to dispatch to aid the caller using mobile phone 104.

An IID (incident identification) is assigned to a 9-1-1 call in system 70 at a juncture within system 70 at which a call may be recognized as a 9-1-1 call. Several loci within system 70 may suffice for effecting assignment of an IID. By way of example and not by way of limitation, an IID may be assigned at emergency service complex 71, at selective router 12, by PSTN 90 (using digit recognition in routing information associated with a call), by ALI database 74 when selective router tandem 72 queries ALI database 74 for information, or at other junctures in system 70. It is preferred that an IID be assigned when selective router 72 queries ALI database 74 for information; it is at that time that a call is unequivocally a bona fide 9-1-1 call for which responsive action is being taken and for which information is required. If the selective router 72 switch type does not query ALI database 74 for information, in the example where on-board selective routing database tables uploaded from ALI on a daily basis, then it is preferred that an IID be assigned when PSAP 76 queries ALI database 74 for information.

Emergency Service Complex controller 73 controls operation of ALI database 74. Queries made by Emergency Service Complex controller 73 (perhaps at the behest or request of an operator at PSAP 76) will be made of registered databases (i.e., other info sources" 86) using the assigned IID, the caller's TN and an appropriate database key for each respective database. Registered databases are databases that have deposited data keys and associated origin-indicators (e.g., TNs) in a data key register 75.

If the caller is a subscriber for emergency notification services to alert designated recipients that a 9-1-1 call is placed from the phone associated with the TN, then the data key (TN or other) and assigned IID of the call event will be 'pushed' to emergency notification facility 82. Emergency notification facility 82 uses the data key (e.g., TN) to match with an emergency notification list pre-selected by the caller—subscriber and notifies each listed contact of the occurrence of the 9-1-1 call event.

Personal 9-1-1 database 84 may involve subscriptions so that information may only be obtained from personal 9-1-1 database 84 if the caller placing the extant 9-1-1 call is a subscriber. Another configuration of system 70 may provide that personal 9-1-1 database 84 is a non-subscription service and ALI database 74 may query personal 9-1-1 database 84 for any 9-1-1 call to receive information contained in personal 9-1-1 database 84 for the caller placing the extant 9-1-1 call. Any database query to any database 84, 86 is preferably accompanied by the IID assigned to the extant 9-1-1 call event and by an appropriate data key (or data keys) for fetching information. The appropriate data key is obtained by emergency service complex controller 73 from data key register 75.

Information obtained from databases 84, 86 and other information associated with the IID-identified 9-1-1 call event is stored in a call history database 96 (preferably included in emergency service complex 71) with the assigned IID for later treatment such as statistical evaluation, reconstruction or other historical or survey uses. By way of example and not by way of limitation, some such later uses may include statistical evaluations by homeland security or similar agencies, evaluation of the number of 9-1-1 calls received from a particular TN (telephone number) or other origin-indicator in a certain time period, an evaluation by an authorized state or federal agency of all data associated with a particular IID, or other historical or survey studies or evaluations. Preferably each registered database, data store or application also maintains a call history (not shown in FIG. 2) to facilitate later surveys, evaluations and other information gathering or event reconstruction.

Figure 3:
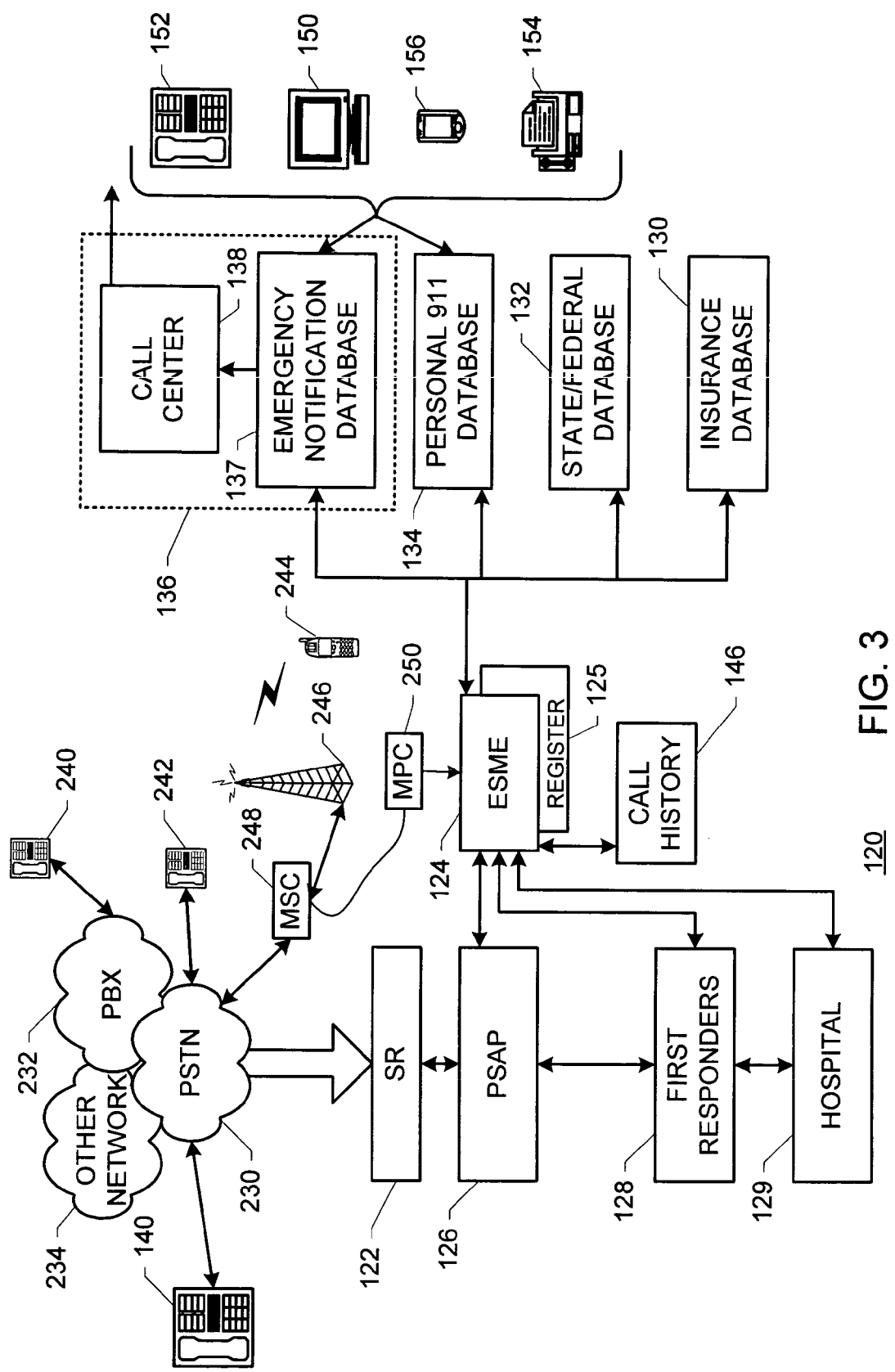
FIG. 3 is a simplified schematic diagram of a third representative emergency services call system suitable for employing the method and system of the present invention.

FIG. 3 is a simplified schematic diagram of a third representative emergency services call system suitable for employing the method and system of the present invention. In FIG. 3, a generic representation of a special number call system is illustrated by an emergency services call system 120. System 120 includes a selective router tandem switch 122 coupled with an emergency services messaging entity (ESME) 124 that includes an ALI system (FIGS. 1 and 2) and associated network elements, control elements and Supplemental ALI information that is generally maintained in emergency service call systems databases. A Public Safety Answering Point (PSAP) 126 is communicatingly coupled with selective router 122 and ESME 124. PSAP 126 also is coupled for communicating with first responders 128 (e.g., emergency medical, police and fire facilities; not shown in detail in FIG. 3). Selected first responders 128 may be coupled for communication with at least one hospital 129 and with ESME 124.

ESME 124 is coupled for communication with an emergency notification facility 136. Emergency notification facility 136 includes an emergency notification database 137 and a call center 138. ESME 124 may be further coupled for querying one or more personal 9-1-1 database 134, one or more insurance company (e.g., automobile or health insurance) database 130, with one or more one state and/or federal database 132 and/or other databases, data stores and applications (not shown in FIG. 3). Personal 9-1-1 database 134 contains information relating to the registered telephone numbers or other origin-indicators of callers. Personal 9-1-1 database 134 may contain critical information about subscribers' households or businesses, as described earlier hereinabove.

9-1-1 emergency calls are received by selective router 122 from any of a variety of networks including, by way of example and not by way of limitation, a public switched telephone network (PSTN) 230, a private branch exchange (PBX) network 232, other networks 234 (e.g., an Internet Protocol network), or a combination of networks 230, 232, 234. Thus, a caller from a phone 240 associated with private branch exchange 232 may place a 9-1-1 call that will be routed via PBX network 232 and PSTN 230 to selective router tandem 122. Similarly, a caller from a phone 140 may place a 9-1-1 call via PSTN 230 to selective router tandem 122. A mobile phone 244 may be used to place a 9-1-1 call via a mobile tower 246, a mobile switching center (MSC) 248 and PSTN 230 to selective router tandem 122. MSC 248 is coupled with a mobile positioning center (MPC) 250. MPC 250 and ESME 124 cooperate both to route the 9-1-1 call to PSAP 126 and to provide position information relating to mobile phone 244 for use by PSAP 126 in selecting which first responders 128 to dispatch to aid the caller using mobile phone 244.

An IID (incident identification) is assigned to a 9-1-1 call in system 120 at a juncture within system 120 at which a call may be recognized as a 9-1-1 call. Several loci within system 120 may suffice for effecting assignment of an IID. By way of example and not by way of limitation, an IID may be assigned by selective router 122, by a serving network handling the 9-1-1 call using digit recognition in routing information associated with a call (not shown in FIG. 3), by ESME 124 when selective router 122 queries ESME 124 for information, by ESME 124 when PSAP 126 queries ESME 124 with an ANI (Automatic Number Identification), by MPC 250 or at other junctures in system 120. It is preferred that an IID be assigned when selective router 122 queries ESME 124 for information; it is at that time that a call is unequivocally a bona fide 9-1-1 call for which responsive action is being taken and for which information is required. If the selective router 72 switch type does not query ALI database 74 for information, in the example where on-board selective routing database tables uploaded from ALI on a daily basis, then it is preferred that an IID be assigned when PSAP 76 queries ALI database 74 for information.

ESME 124 includes a data key register 125 in which databases (e.g., databases 130, 132) register data keys associated with respective origin-indicators. Origin-indicators include, by way of example and not by way of limitation, telephone numbers, ESRK, call back number or other indication of origin of a call. Some origin-indicators indicate origin only in a gross sense. For example, ESRKs, indicate origin only to a particular telecommunication carrier at a particular PSAP. In contrast, telephone numbers (TNs) indicate origin to a particular phone instrument. Register 125 is populated with data by a registration process carried out by external databases, as will be explained in greater detail hereinafter in connection with FIG. 5.

Queries made by ESME 124 (perhaps at the behest or request of an operator at PSAP 126) are be made of registered databases (i.e., databases 132, 130 or other databases not shown in FIG. 3) using the assigned IID and an appropriate data key for each respective database. Registered databases are databases that have deposited data keys and associated origin-indicators (e.g., TNs) in data key register 125.

If the caller is a subscriber for emergency notification services to alert designated recipients that a 9-1-1 call is placed from the phone associated with one of the TNs associated with a data key, then the data key and assigned IID of the caller will be 'pushed' to emergency notification facility 136. Emergency notification facility 136 employs emergency notification database 137 to match the data key received (i.e., "pushed") with an emergency notification list pre-selected by the caller-subscriber. Emergency notification database 137 cooperates with call center 138 to notify each listed contact regarding the occurrence of the 9-1-1 call event. A single call event may involve notifying more than one phone number. Call center 138 may effect the required notification by one or more of several methods including, by way of example and not by way of limitation, automated phone call—wireline or wireless, phone call placed by a human operator, e-mail, pager, text message, facsimile or another method or combination of methods.

Personal 9-1-1 database 134 may involve subscriptions so that information may only be obtained from personal 9-1-1 database 134 if the caller placing the extant 9-1-1 call is a subscriber. Another configuration of system 120 may provide that personal 9-1-1 database 134 is a non-subscription service and ESME 124 may query personal 9-1-1 database 134 for any 9-1-1 call to receive information contained in personal 9-1-1 database 134 relating to the caller placing the extant 9-1-1 call. Any database query to any database 130, 132, 134, 137 or another database is preferably accompanied by the ID assigned to the extant 9-1-1 call event and by an appropriate data key (or data keys) for each respective data base (obtained from register 125) to facilitate current and/or later treatment of data associated with the particular 9-1-1 call event associated with the respective IID.

A subscriber of personal 9-1-1 information services or of emergency notification services may use any one of several methods for submitting their personal information for inclusion in personal 9-1-1 database 134 or emergency notification database 137 such as, by way of example and not by way of limitation: via a computer 150 to send an e-mail via the Internet; calling a personal 9-1-1 representative using a phone 152; calling an interactive voice response (IVR) system using a phone 152; mailing in a personal information form via the postal service; using computer 150 to enter information to a web site provided for receiving updates to personal 9-1-1 database 134 or to emergency notification database 137; submitting information via a facsimile machine 154; submitting information via a Voice Over IP (VoIP) connection; submitting information using a personal digital assistant (PDA) 156 or similar wireless device or by another communication method.

For those submission methods not involving a human operator, a subscriber submits personal information using a respective submission method and a personal 9-1-1 application program receives the update, validates the sender and sends the update to a database server (not shown in FIG. 3) associated with one or more of personal 9-1-1 database 134 and emergency notification database 137 to apply the data to at least one of personal 9-1-1 information database 134, emergency notification database 137 or integrated directly with the ALI database (not shown in FIG. 3) within ESME 124. Preferably, when the database server applies the update to personal 9-1-1 information database and/or emergency notification database 137 the database server also registers with register 125 at the applicable ESME 124 for the TN(s) designated by the subscriber. Methods that involve a human operator may operate similarly except that instead of the subscriber submitting personal 9-1-1 data to a database server, a human operator enters the information to a database server on the subscriber's behalf either directly from a phone call or after receipt of the information via an electronic submission method such as e-mail, entry of information into a web site, facsimile (FAX), or another method.

Information obtained from databases 130, 132, 134 and other information associated with the ID-identified 9-1-1 call event is stored in a call history database 146 with the assigned IID for later treatment, such as statistical evaluation, reconstruction or other historical or survey uses. By way of example and not by way of limitation, some such later uses may include statistical evaluations by homeland security or similar agencies, evaluation of the number of 9-1-1 calls received from a particular TN (telephone number) or other communication device in a certain time period, an evaluation by an authorized state or federal agency of all data associated with a particular IID or other historical or survey studies or evaluations. Preferably each registered database data store and application also maintains a call history (not shown in FIG. 3) to facilitate later surveys, evaluations and other information gathering or event reconstruction.

Figure 4:
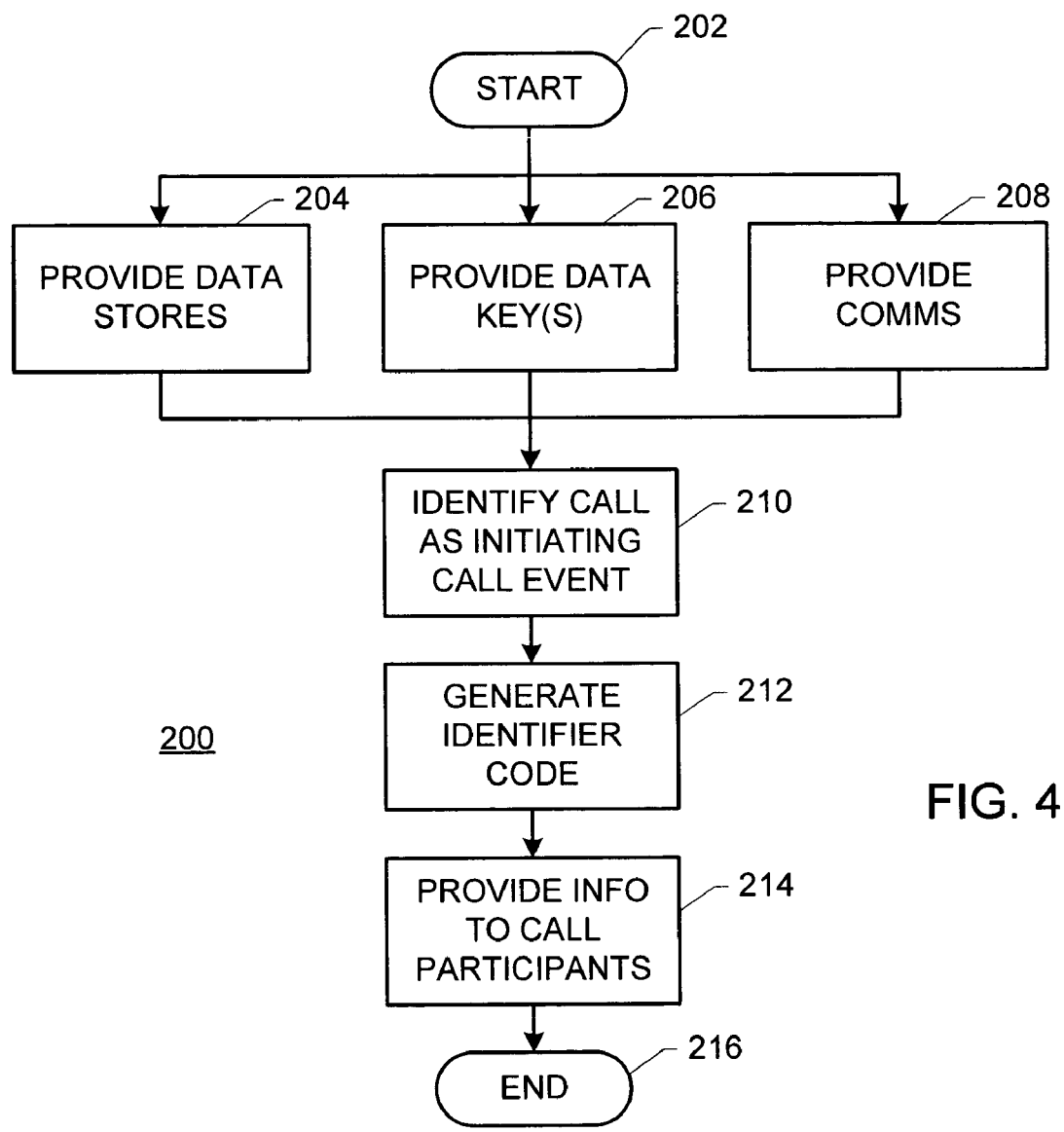
FIG. 4 is a flow chart illustrating the preferred embodiment of the method of the present invention.

FIG. 4 is a flow chart illustrating the preferred embodiment of the method of the present invention. In FIG. 4, a method 200 for availing participants in a special number call event of information contained in a plurality of data stores begins at a START locus 202. Method 200 continues with the step of, in no particular order: (1) providing the plurality of data stores, as indicated by a block 204; (2) providing at least one respective data key and associated origin-indicators for accessing the information contained in each respective data store of the plurality of data stores, as indicated by a block 206; and (3) providing communications among the participants and the plurality of data stores, as indicated by a block 208.

Method 200 continues with the step of identifying a respective call as initiating a special number call event, as indicated by a block 210. Method 200 continues with the step of generating an identifier code for uniquely identifying the special number call event, as indicated by a block 212. The identifier code includes relational data that is configured for mapping on the at least one respective data key to effect accessing the information.

Method 200 continues with the step of employing the communications to effect cooperation by the identifier code with each respective data store for providing the information to the participants, as indicated by a block 214. Method 200 terminates at an END locus 216.

Figure 5:
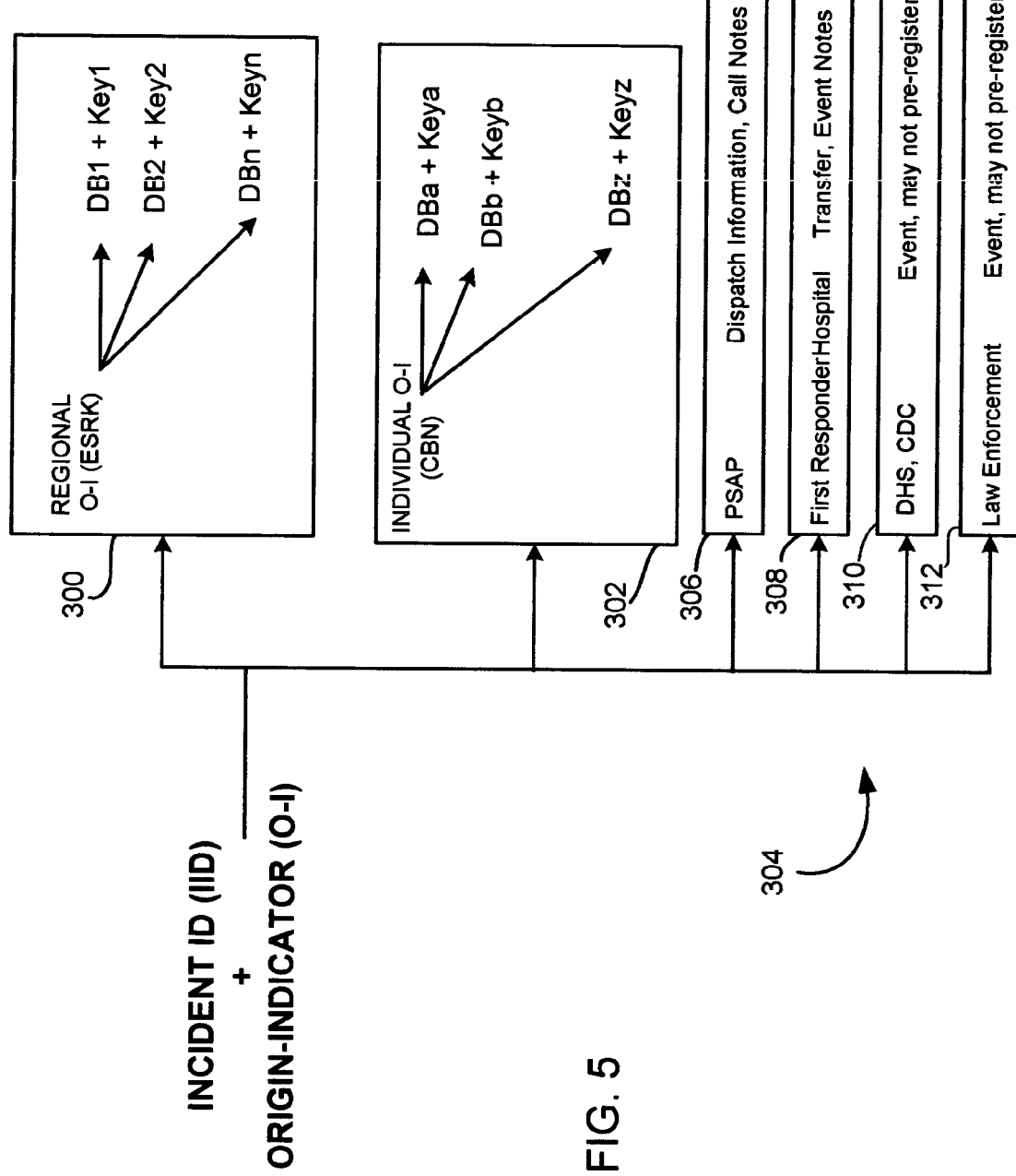
FIG. 5 is a schematic diagram illustrating the preferred embodiment of selecting at least one data key to effect accessing information.

FIG. 5 is a schematic diagram illustrating the preferred embodiment of selecting at least one data key to effect accessing information. In FIG. 5, registers 300, 302 record registration of origin-indicators with respect to a plurality of databases and data key(s) for each respective database. Register 300 relates regional origin-indicators (O-I), such as emergency service routing keys (ESRK) with databases DB1, DB2, DBn. Database DB1 registers a data key KEY1. Database DB2 registers a data key KEY2. Database DBn registers a data key KEYn. Register 302 relates individual O-Is, such as call back numbers (CBN), Social Security Number (SSN), or Customer ID with databases DBa, DBb, DBz. Database DBa registers a data key KEYa. Database DBb registers a data key KEYb. Database DBz registers a data key KEYz.

A regional O-I is a number that is used for routing to a regional area. An ESRK is an example of a regional O-I that is a routable but not necessarily dialable number that is used for routing and for mating data provided to a region, such as to a PSAP via different paths, such as a voice path, an ALI path or another path. Thus an ESRK provides gross granularity in its representation of origin. An ESRK is generally maintained in a reusable pool by a PSAP according to telecommunication carrier. As an event is ended, the then-employed ESRK is returned to the pool for later re-use. Other temporary numbers or pseudo-ANIs used for routing (e.g ESRD, ESRK or ELIN) are also regional O-Is.

An individual O-I is a general term indicating any one of a number of origin-indicators that permit calling back a caller and may include call back numbers (CBN), telephone numbers), TN, TN with PBX extension, IP address, email address and other origin-indicators that permit identification of an individual calling instrument.

Registers 300, 302 represent information that can be preregistered in advance of occurrence of a call event, whether it is information relating to a region or a physical location or information related to an individual. Geographic origin-indicators (e.g., ESRK; register 300) may relate to State of Federal criminal databases, Department of Homeland Security (DHS) or Center for Disease Control (CDC) applications and other such applications that involve information that may be identified beforehand as relating to a region. By way of further example and not by way of limitation, information relating to particular individual callers having particular telephone numbers (e.g., call back number; register 302) may relate to data stores having data keys associated with individuals, such as customer identification number, social security number or similar personal identifiers as well as for notification services.

Another group of information sources 304 relate to dynamic information that is unique to each respective call event. No preregistration is feasible for such information sources. Examples of such information sources and their information include, by way of example and not by way of limitation, PSAPs 306 having dispatch information and call notes, first responders 308 having hospital transfer information and event notes, DHS/CDC 310 having event-related information that cannot be preregistered and law enforcement agencies 312 having event-related information that cannot be preregistered.

When a query is made to a database, such as when ALI controller 15 queries other information sources 26 (FIG. 1), when emergency service complex controller 73 queries other data stores 86 (FIG. 2) or when ESME 124 queries databases 130, 132 (FIG. 3), a data key KEYn, KEYz is selected from a register 300, 302 and used with a respective data store 86, 130, 132 for accessing data. The data key is ascertained by presenting an identifier code (IID plus O-I) to a register 300, 302 and using relationships stored in registers 300, 302 to determine appropriate database(s) DBn, DBz and respective appropriate data key(s) KEYn, KEYz for the extant identifier code. The identifier code may be embodied in the incident identifier (IID) alone or the identifier code may be embodied in the incident identifier with a plurality of origin-indicators of various types (e.g., regional or individual). Preferably an incident identification (IID) is presented with the data key KEYn, KEYz when querying a data store 86, 130, 132 to facilitate later evaluation or surveying of data associated with the call event related to the IID. If no data key KEYn, KEYz is found associated with the origin-indicator (e.g., ESRK, CBN) associated with the extant call event then no access is sought to a data store 86, 130, 132.

An IID may be used for accessing some data stores containing dynamic data such as information sources 304.

It is to be understood that, while the detailed drawings and specific examples given describe preferred embodiments of the invention, they are for the purpose of illustration only, that the apparatus and method of the invention are not limited to the precise details and conditions disclosed and that various changes may be made therein without departing from the spirit of the invention which is defined by the following claims:

We claim:

1. A method for availing participants in a special number call event of information contained in a plurality of data stores; the method comprising the steps of:
    (a) in no particular order:
        (1) providing said plurality of data stores;
        (2) providing at least one respective data key for accessing said information contained in each respective data store of said plurality of data stores; and
        (3) providing communications among said participants and said plurality of data stores;
    (b) identifying a respective call as initiating a special number call event, said respective call having an origin indicator associated therewith;
    (c) generating an identifier code for uniquely identifying said special number call event; said identifier code including said origin indicator; said origin indicator mapping on said at least one said respective data key to effect accessing said information; and
    (d) employing said communications to effect cooperation by said identifier code with each said respective data store for providing said information to said participants.

2. A method for availing participants in a special number call event of information contained in a plurality of data stores as recited in claim 1 wherein selected said information availed by said participants during said call event is stored in association with said identifier code.

3. A method for availing participants in a special number call event of information contained in a plurality of data stores as recited in claim 1 wherein said origin indicator relates to a caller initiating said call event.

4. A method for availing participants in a special number call event of information contained in a plurality of data stores as recited in claim 1 wherein said providing a plurality of data stores is effected in a subscription arrangement.

5. A method for availing participants in a special number call event of information contained in a plurality of data stores as recited in claim 2 wherein said origin indicator relates to a caller initiating said call event.

6. A method for availing participants in a special number call event of information contained in a plurality of data stores as recited in claim 2 wherein said providing a plurality of data stores is effected in a subscription arrangement.

7. A method for availing participants in a special number call event of information contained in a plurality of data stores as recited in claim 6 wherein said origin indicator relates to a caller initiating said call event.

8. A method for availing participants in a special number call event of information contained in a plurality of data stores as recited in claim 1 wherein said special number call is an emergency service call.

9. A method for availing participants in a special number call event of information contained in a plurality of data stores as recited in claim 2 wherein said special number call is an emergency service call.

10. A method for availing participants in a special number call event of information contained in a plurality of data stores as recited in claim 3 wherein said special number call is an emergency service call.

11. A method for availing participants in a special number call event of information contained in a plurality of data stores as recited in claim 4 wherein said special number call is an emergency service call.

12. A method for providing information to participants in an emergency service call event; the method comprising the steps of:
    (a) in no particular order:
        (1) providing a plurality of data stores;
        (2) providing at least one respective data key for accessing said information contained in each respective data store of said plurality of data stores; and
        (3) providing communications among said participants and said plurality of data stores;
    (b) identifying a respective call as initiating an emergency service call event, said respective call having an origin indicator associated therewith;
    (c) generating an identifier code for uniquely identifying said emergency service call event; said identifier code including said origin indicator; said origin indicator mapping on said at least one respective data key for effecting access to said information from each said respective data store; and
    (d) employing said communications to effect cooperation by said identifier code with said plurality of data stores for providing said information to said participants.

13. A method for providing information to participants in an emergency service call event as recited in claim 12 wherein selected said information availed by said participants during said call event is stored in association with said identifier code.

14. A method for providing information to participants in an emergency service call event as recited in claim 12 wherein said origin indicator relates to a caller initiating said call event.

15. A method for providing information to participants in an emergency service call event as recited in claim 12 wherein said providing said plurality of data stores is effected in a subscription arrangement.

16. A method for providing information to participants in an emergency service call event as recited in claim 13 wherein said origin indicator relates to a caller initiating said call event.

17. A method for providing information to participants in an emergency service call event as recited in claim 13 wherein said providing said plurality of data stores is effected in a subscription arrangement.

18. A method for providing information to participants in an emergency service call event as recited in claim 15 wherein said origin indicator relates to a caller initiating said call event.

19. A system for availing participants in a special number call event of information contained in a plurality of data stores; each respective data store of said plurality of data stores having a respective data key for accessing said information contained in said respective data store; the system comprising:
(a) a special number call handling facility;
(b) at least one communication network communicatingly coupling said participants, said plurality of data stores and said special number call handling facility; and
(c) an identifying unit coupled with at least one of said special number call handling facility and said at least one communication network;
said identifying unit identifying a respective call as initiating a special number call event, said respective call having an origin indicator associated therewith; said identifying unit generating an identifier code for uniquely identifying said special number call event; said identifier code including said origin indicator; said origin indicator mapping on at least one said respective data key to effect accessing said information; said special number call handling facility employing said at least one communication network for providing said information to said participants.

20. A system for availing participants in a special number call event of information contained in a plurality of data stores as recited in claim 19 wherein selected said information availed by said participants during said call event is stored in association with said identifier code.

21. A system for availing participants in a special number call event of information contained in a plurality of data stores as recited in claim 19 wherein said origin indicator relates to a caller initiating said call event.

22. A system for availing participants in a special number call event of information contained in a plurality of data stores as recited in claim 19 wherein said plurality of data stores are qualified for participation with the system in a subscription arrangement.

23. A system for availing participants in a special number call event of information contained in a plurality of data stores as recited in claim 20 wherein said origin indicator relates to a caller initiating said call event.

24. A system for availing participants in a special number call event of information contained in a plurality of data stores as recited in claim 20 wherein said plurality of data stores are qualified for participation with the system in a subscription arrangement.

25. A system for availing participants in a special number call event of information contained in a plurality of data stores as recited in claim 22 wherein said origin indicator relates to a caller initiating said call event.

26. A system for availing participants in a special number call event of information contained in a plurality of data stores as recited in claim 23 wherein said special number call event is an emergency service call event.

27. A system for availing participants in a special number call event of information contained in a plurality of data stores as recited in claim 25 wherein said special number call event is an emergency service call event.

* * * * *